Dec. 22. 1931.  G. T. MARKEY  1,837,458

AIR MIXER AND CIRCULATOR

Filed Oct. 6, 1928

INVENTOR,
George T. Markey
BY
Erwin Wheeler & Woolard
ATTORNEYS.

Patented Dec. 22, 1931

1,837,458

UNITED STATES PATENT OFFICE

GEORGE T. MARKEY, OF FORT ATKINSON, WISCONSIN, ASSIGNOR TO JAMES MANUFACTURING COMPANY, OF FORT ATKINSON, WISCONSIN, A CORPORATION OF WISCONSIN

AIR MIXER AND CIRCULATOR

Application filed October 6, 1928. Serial No. 310,680.

This invention relates to improvements in air mixers and circulators designed for use in homogenizing and circulating air in incubators and in general for churning and mixing air and gases.

Objects of this invention are to equalize the temperatures in a circulatory system, mix fresh air or gas with that which is being recirculated, maintain a uniform degree of purity in the system and vitalize air in such system by churning it and keeping it in motion.

It is also an object of this invention to provide means whereby air or gases derived from different sources of supply or from different portions of the same source of supply may be separately received and acted upon by the movable element of the churning device in such a manner that the air or gas from each source of supply will be mixed with that from the other source or sources to produce a homogeneous product.

A further object of this invention is to provide means, associated with the churning device, for delivering a predetermined percentage of the mixed product out of the system and replacing the quantity so delivered from an exterior source of supply while circulating and rechurning the remainder, and maintaining the circulating fluid uniformly in a constant condition as to temperature and purity.

In the drawings.

Like parts are identified by the same reference characters throughout the several views.

Figure 1:
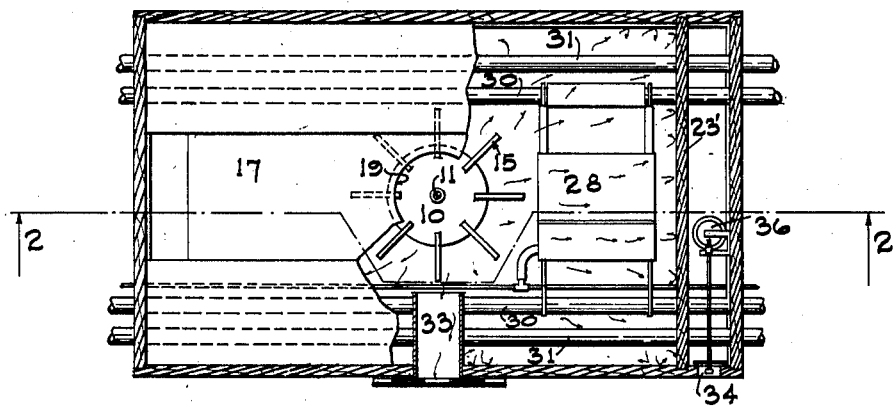
Figure 1 is a plan view (partly in horizontal section on line 1—1 of Figure 2) of an air mixer and circulator embodying my invention, showing the same as employed for circulating air in an incubator.

A plate or disk 10 is secured to a shaft 11 which may be rotated from any suitable source of power. In the construction shown, the plate or disk is secured to the shaft by means of the hub 12 and set screw 13. The outer margin of the plate or disk is provided with a series of radially projecting wings 15 similar to those of an ordinary centrifugal fan but preferably located in radial planes and having flat plane surfaces instead of being curved as is common in the construction of centrifugal fans.

It will be observed, however, that the wings 15 have their upper margins at a substantial distance above the plate or disk 10 and their lower margins at a substantial distance below it. In the construction shown, the portions above the disk are substantially equal in area to the portions below it, whereby, when the disk is rotated, air will be driven from space above and below the disk outwardly by centrifugal force in planes substantially parallel to that of the disk.

Figure 2:
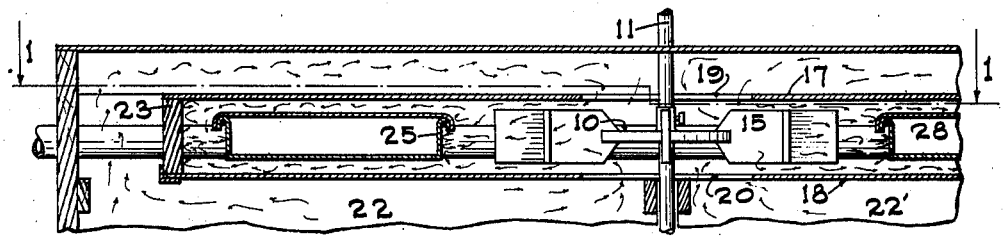
Figure 2 is a view of the same in vertical section drawn generally to line 2—2 of Figure 1.
Figure 3:
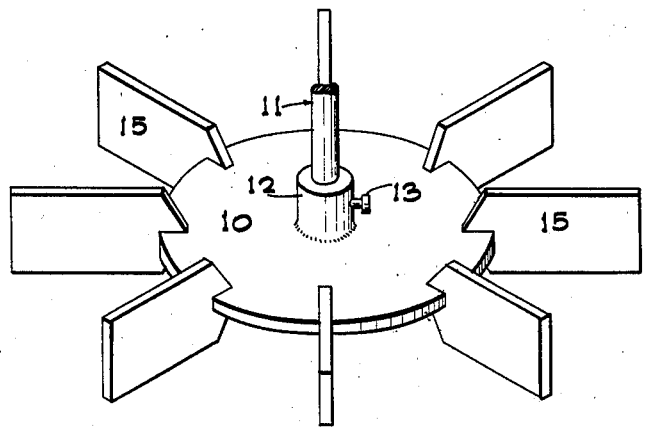
Figure 3 is an isometric view of the rotary impeller.

The disk is rotated between the two parallel walls 17 and 18, each of which is apertured to provide air inlet openings 19 and 20 respectively to admit air to space on opposite sides of the disk along the axis of the impeller formed by the disk and its radially projecting wings 15. The air reaching the impeller through the aperture 19 may come from a different source of supply from that reaching the impeller through the aperture 20. On the other hand it may come from different portions of the same space or chamber. For example, in the construction as shown in Figure 2, air from the space 22 may pass to the left around an end wall or baffle 23 connecting the walls 17 and 18 and this air may then pass inwardly toward the shaft 11 and downwardly through the opening 19, whereas air from the inner portion of the space 22 may flow to the right toward the shaft 11 and upwardly toward the aperture 20 to the underside of the disk 10.

Both currents of air will be driven outwardly from the respective sides of the disk and upon striking any wall or baffle will be thoroughly intermingled, reversed, churned and distributed. For example, a portion of the air driven to the left in Figure 2 will strike the wall 25 of a pan or other receptacle and some of it will be diverted upwardly some downwardly and some laterally. Some will rebound in the direction of the impeller. Other portions are driven around the chamber of which the wall 25 is a part and continue until such portions strike the baffle wall 23 whereupon a similar eddying and churning result will be obtained. It may be assumed that the chamber of which the wall 25 is a part is similar to the chamber 28 illustrated at the right hand in Figure 1 and that the wall 23' is similar to the wall 23 shown at the left in Figure 2.

It may be assumed that the space between the walls 17 and 18 is for outlets commensurate with the capacity of the inlet apertures 19 and 20. If there are no side walls between the baffle walls 23 and 23' the air will, of course, be free to escape laterally and in the construction shown in Figure 1 this air may be driven across pipes 30 and 31 and downwardly in the space between these pipes from which it may eventually find its way back to the space 22 or 22' illustrated in Figure 2, thereby establishing a circulatory system.

Some of the air may be driven out to the exterior through a laterally extending passage 33 and fresh air may be admitted to the system through a valved passage indicated at 34. In the construction shown, the valve at 34 is controlled by a thermostat 36 whereby the quantity of fresh air admitted may be controlled in accordance with the temperature of the air in the circulatory system. The employment of thermostatic control and the question as to whether fresh air or gas is to be admitted to the system in proportion to another quantity that is being expelled will, of course, depend in each case on the purpose of the system and the character of the fluid that is being handled. These features, including the pipes 30 and 31 and the chambers 28, form no part of the invention herein claimed but are adapted to be used in connection with an incubator described and claimed in my companion application, Serial No. 282,302, filed June 2, 1928 for a heating system for incubators.

They are referred to in this application for the purpose of explanation and illustration of one manner in which my improved air mixer and circulator may be employed for obtaining homogeneous conditions in a circulatory system which would otherwise show a constant tendency to become unbalanced as to temperature, rate of circulation in different portions of the system and in atmospheric purity. In the circulation of air through chambers having some walls exposed for heat radiation and other portions subject to little loss of heat the tendency is for the warmer air to rise in the portions where the heat loss is smallest and to descend in portions where the temperatures are lowest. Also in other systems the resistance may be greater in one portion of a chamber than in another portion due to the presence of a greater number of deflecting or obstructing objects and in either of the instances here referred to the circulation tends to become unbalanced in both velocity and temperature. Insofar as the unbalanced condition for any given quantity of the circulating fluid exists during only one traverse of the system the injury may be slight, whereas, if allowed to accentuate by repetition, widely varying conditions of temperature, ventilation or other unequal effects may result. By employing a positively driven mixer and air circulator of the type herein disclosed high velocities may be checked, low velocities accelerated, temperatures equalized and uniform conditions otherwise maintained.

I claim:

1. An air mixing and circulating device comprising a generally rectangular chamber having substantially parallel walls provided with inlet apertures, an impeller driving shaft in a line substantially coinciding with the centers of said apertures and provided with a disk substantially parallel to said walls and provided with impeller wings extending on both sides of the plane of the disk, said chamber having baffles on two sides of the impeller wings disposed tangentially to circles concentric with the disk and arranged to break up the air currents generated by the wings and commingle the air coming from above the disk with that coming from below it, said walls having openings along the sides not occupied by the baffles adapted to allow delivery of the churning air from said chamber.

2. An air mixing and circulating device comprising a generally rectangular chamber having substantially parallel walls provided with inlet apertures, an impeller driving shaft in a line substantially coinciding with the centers of said apertures and provided with a disk substantially parallel to said walls and provided with impeller wings extending on both sides of the plane of the disk, said chamber having baffles on two sides of the impeller wings disposed tangentially to circles concentric with the disk and arranged to break up the air currents generated by the wings and commingle the air coming from above the disk with that coming from below it, said wall having openings along the sides not occupied by the baffles, adapted to allow delivery of the churning air from said chamber, and additional walls spaced from the walls of said chamber across the path of the delivered air and adapted to direct such air in planes transverse to that in which the impeller revolves.

3. An air mixing and circulating device comprising a chamber having substantially parallel walls oppositely apertured and marginally unconnected along two sides to provide slot-like outlets, a rotary impeller located between the inlet apertures and revoluble in a central plane substantially parallel to said walls, and a set of current interrupting eddy producing baffles located at a substantial distance from the impeller on two sides of its axis and across the space between the ends of the outlets, said baffles and the first mentioned walls forming a mixing chamber of a generally rectangular form.

GEORGE T. MARKEY.